(12) United States Patent
Sakurai et al.

(10) Patent No.: US 10,731,607 B2
(45) Date of Patent: Aug. 4, 2020

(54) AIR INTAKE APPARATUS FOR INTERNAL COMBUSTION ENGINE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Yu Sakurai, Obu (JP); Masaki Makihara, Okazaki (JP)

(73) Assignees: AISIN SEIKI KABUSHIKI KAISHA, Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 38 days.

(21) Appl. No.: 15/778,043

(22) PCT Filed: Nov. 8, 2016

(86) PCT No.: PCT/JP2016/083043
§ 371 (c)(1),
(2) Date: May 22, 2018

(87) PCT Pub. No.: WO2017/090419
PCT Pub. Date: Jun. 1, 2017

(65) Prior Publication Data
US 2018/0347520 A1 Dec. 6, 2018

(30) Foreign Application Priority Data
Nov. 25, 2015 (JP) .................................. 2015-229258

(51) Int. Cl.
*F02M 26/20* (2016.01)
*F02M 35/112* (2006.01)
(Continued)

(52) U.S. Cl.
CPC ............ *F02M 26/20* (2016.02); *F02M 25/06* (2013.01); *F02M 26/17* (2016.02); *F02M 35/10* (2013.01);
(Continued)

(58) Field of Classification Search
CPC ........ F02M 26/17; F02M 26/19; F02M 26/20; F02M 35/10354; F02M 35/1036
See application file for complete search history.

(56) References Cited

U.S. PATENT DOCUMENTS 6,334,437 B1 * 1/2002 Jessberger ............. F02M 26/41
123/568.12
7,305,958 B2 * 12/2007 Doko ............... F02M 35/10039
123/184.21
(Continued)

FOREIGN PATENT DOCUMENTS

CN 104832326 A 8/2015
JP 51-147822 U 11/1976
(Continued)

OTHER PUBLICATIONS

International Search Report (PCT/ISA/210) dated Jan. 24, 2017, by the Japan Patent Office as the International Searching Authority for International Application No. PCT/JP2016/083043.
(Continued)

Primary Examiner — Kevin R Steckbauer
(74) Attorney, Agent, or Firm — Buchanan Ingersoll & Rooney PC (57) ABSTRACT

In this air intake apparatus for an internal combustion engine, an external gas passage includes external gas introduction nozzles that introduce external gas into air intake pipes, and a length of each of the external gas introduction nozzles in a direction in which the external gas introduction
(Continued)

nozzles extend is larger than an equivalent diameter of an exit of each of the external gas introduction nozzles.

7 Claims, 3 Drawing Sheets

(51) Int. Cl.
    *F02M 35/10*     (2006.01)
    *F02M 35/104*     (2006.01)
    *F02M 25/06*     (2016.01)
    *F02M 26/17*     (2016.01)

(52) U.S. Cl.
    CPC ...... *F02M 35/104* (2013.01); *F02M 35/1036* (2013.01); *F02M 35/10072* (2013.01); *F02M 35/10222* (2013.01); *F02M 35/10275* (2013.01); *F02M 35/10321* (2013.01); *F02M 35/112* (2013.01); *Y02T 10/121* (2013.01)

(56) References Cited

U.S. PATENT DOCUMENTS

| | | | | |
|---|---|---|---|---|
| 8,037,859 | B2* | 10/2011 | Kameda | F02M 35/10144 |
| | | | | 123/184.21 |
| 8,181,633 | B2* | 5/2012 | Ito | F02B 31/06 |
| | | | | 123/568.17 |
| 8,511,289 | B2* | 8/2013 | Tanikawa | F02M 35/10039 |
| | | | | 123/184.42 |
| 9,057,346 | B2* | 6/2015 | Sato | F02M 35/10072 |
| 9,133,741 | B2* | 9/2015 | Senda | F01M 13/0011 |
| 9,399,957 | B2* | 7/2016 | Sato | F02B 27/0215 |
| 9,739,237 | B2* | 8/2017 | Nagasaki | F02M 26/20 |
| 9,790,897 | B2* | 10/2017 | Martins | F02M 35/10078 |
| 10,082,112 | B2* | 9/2018 | Nakamura | F02M 26/20 |
| 10,100,716 | B2* | 10/2018 | Choi | F02M 26/02 |
| 10,113,519 | B2* | 10/2018 | Ito | F02M 35/10091 |
| 10,161,366 | B2* | 12/2018 | Ito | F02M 26/13 |
| 10,174,726 | B2* | 1/2019 | Kusuda | F02M 35/10039 |
| 10,344,720 | B2* | 7/2019 | Ito | F02M 26/17 |
| 10,352,277 | B2* | 7/2019 | Ito | F02M 35/10222 |
| 10,359,007 | B2* | 7/2019 | Ito | F02M 26/00 |
| 10,364,776 | B2* | 7/2019 | Teramoto | F02M 35/104 |
| 2004/0159299 | A1* | 8/2004 | Uchiyama | F02M 25/06 |
| | | | | 123/184.42 |
| 2005/0098846 | A1* | 5/2005 | Nagaoka | H01L 29/0634 |
| | | | | 257/487 |
| 2006/0191505 | A1* | 8/2006 | Doko | F02M 35/10039 |
| | | | | 123/184.59 |
| 2006/0194392 | A1* | 8/2006 | Nagaoka | H01L 29/0634 |
| | | | | 438/268 |
| 2010/0288247 | A1* | 11/2010 | Tanikawa | F02M 35/10039 |
| | | | | 123/568.11 |
| 2011/0174279 | A1* | 7/2011 | Ito | F02B 31/06 |
| | | | | 123/568.18 |
| 2013/0081601 | A1* | 4/2013 | Martins | F02M 26/02 |
| | | | | 123/568.12 |
| 2013/0125851 | A1* | 5/2013 | Miyashita | F02M 35/104 |
| | | | | 123/184.21 |
| 2013/0167814 | A1* | 7/2013 | Martins | F02M 35/10078 |
| | | | | 123/568.17 |
| 2014/0014056 | A1* | 1/2014 | Sato | F02M 35/10072 |
| | | | | 123/184.47 |
| 2014/0102429 | A1* | 4/2014 | Hayman | F02M 35/10222 |
| | | | | 123/568.18 |
| 2015/0337771 | A1* | 11/2015 | Nagasaki | F02M 26/20 |
| | | | | 123/568.11 |
| 2017/0241377 | A1* | 8/2017 | Ito | F02B 47/08 |
| 2017/0268414 | A1* | 9/2017 | Choi | F02M 26/02 |
| 2017/0306895 | A1* | 10/2017 | Teramoto | F02M 35/104 |
| 2017/0356405 | A1* | 12/2017 | Kusuda | F02M 35/10222 |
| 2018/0347520 | A1* | 12/2018 | Sakurai | F02M 35/10275 |
| 2018/0372039 | A1* | 12/2018 | Sakurai | F02M 35/104 |

FOREIGN PATENT DOCUMENTS

| | | |
|---|---|---|
| JP | 3786098 B2 | 6/2006 |
| JP | 3964690 B2 | 8/2007 |
| JP | 2011-225140 A | 11/2011 |
| JP | 2012-079601 A | 4/2012 |
| JP | 2015-148188 A | 8/2015 |
| JP | 2015148188 A * | 8/2015 |
| WO | 2012/137486 A1 | 10/2012 |

OTHER PUBLICATIONS

Written Opinion (PCT/ISA/237) dated Jan. 24, 2017, by the Japan Patent Office as the International Searching Authority for International Application No. PCT/JP2016/083043.

* cited by examiner

AIR INTAKE APPARATUS FOR INTERNAL COMBUSTION ENGINE

TECHNICAL FIELD

The present invention relates to an air intake apparatus for an internal combustion engine, and more particularly, it relates to an air intake apparatus for an internal combustion engine in which external gas is introduced into air intake pipes.

BACKGROUND ART

In general, an air intake apparatus for an internal combustion engine in which external gas is introduced into air intake pipes is known. Such an air intake apparatus is disclosed in Japanese Patent No. 3964690, for example.

Japanese Patent No. 3964690 discloses a manifold (air intake apparatus) for a multi-cylinder (four-cylinder) engine in which blow-by gas (an unburned air-fuel mixture) is introduced into air intake pipes. In this air intake apparatus disclosed in Japanese Patent No. 3964690, a cutout through which the blow-by gas is introduced into an air intake pipe of each cylinder is provided. A distribution passage groove that distributes the blow-by gas to each cylinder and the air intake pipe of each cylinder are connected to each other via the cutout of the air intake pipe. The length of the cutout in a direction in which the blow-by gas flows (the length between the distribution passage groove and the air intake pipe) is smaller than the width of the cutout (the width in a direction perpendicular to the direction in which the blow-by gas flows). That is, the blow-by gas is introduced into the air intake pipe from the distribution passage groove via the cutout of a relatively short path.

PRIOR ART

Patent Document

Patent Document 1: Japanese Patent No. 3964690

SUMMARY OF THE INVENTION

Problem to be Solved by the Invention

In the air intake apparatus disclosed in Japanese Patent No. 3964690, however, the blow-by gas is introduced into the air intake pipe from the distribution passage groove via the relatively short path (cutout), and hence there is a disadvantage that air may flow back from the air intake pipe to the distribution passage groove (external gas passage) via the cutout due to pulsation of the air that flows through the air intake pipe. Therefore, there is a problem that the performance of the engine may decrease.

The present invention has been proposed in order to solve the aforementioned problem, and an object of the present invention is to provide an air intake apparatus for an internal combustion engine capable of significantly reducing or preventing a decrease in the performance of the engine due to backflow of air to an external gas passage.

Means for Solving the Problem

In order to attain the aforementioned object, an air intake apparatus for an internal combustion engine according to an aspect of the present invention includes a plurality of air intake pipes respectively connected to a plurality of cylinders of the internal combustion engine and an external gas passage that distributes external gas to the plurality of air intake pipes, the external gas passage extends toward a head port of a head of the internal combustion engine connected to the air intake pipes, and includes external gas introduction nozzles that introduce the external gas into the air intake pipes, and a length of each of the external gas introduction nozzles in a direction in which the external gas introduction nozzles extend is larger than an equivalent diameter of an exit of each of the external gas introduction nozzles.

In the air intake apparatus for an internal combustion engine according to this aspect of the present invention, as hereinabove described, the length of each of the external gas introduction nozzles in the direction in which the external gas introduction nozzles extend is larger than the equivalent diameter of the exit of each of the external gas introduction nozzles. Thus, the length of each of the external gas introduction nozzles is relatively large, and hence the pressure loss increases when air flows back from the air intake pipes to the external gas introduction nozzles. Consequently, it becomes difficult for the air to flow back from the air intake pipes to the external gas introduction nozzles, and hence it is possible to significantly reduce or prevent a decrease in the performance of the engine due to backflow of the air to the external gas passage. Furthermore, it becomes difficult for the air to flow back from the air intake pipes to the external gas introduction nozzles, and hence it is possible to significantly reduce or prevent variations in the amount of the external gas distributed to the plurality of cylinders (to improve the distributivity).

In the aforementioned air intake apparatus for an internal combustion engine according to this aspect, an inner peripheral surface of each of the external gas introduction nozzles is preferably formed in a tapered shape tapered toward the head port.

According to this structure, as compared with the case where the inner diameter of each of the external gas introduction nozzles is constant, the pressure loss further increases when the air flows back from the air intake pipes to the external gas introduction nozzles, and hence it is possible to further significantly reduce or prevent a decrease in the performance of the engine due to backflow of the air to the external gas passage. Furthermore, the inner peripheral surface of each of the external gas introduction nozzles is formed in a tapered shape tapered toward the head port such that the external gas is introduced toward the head port, and hence disruption of flow of intake air that flows through the air intake pipes is significantly reduced or prevented. Consequently, it is possible to significantly reduce or prevent a decrease in the flow velocity of the intake air. Moreover, the inner peripheral surface of each of the external gas introduction nozzles is formed in a tapered shape tapered toward the head port such that when the external gas introduction nozzles are formed by resin molding, the external gas introduction nozzles can be easily resin-molded by moving a metal mold to the side opposite to the head port (in a direction opposite to a tapered direction). Thus, the external gas introduction nozzles can be resin-molded integrally with the air intake apparatus main body without separately adding a member (piece).

In the aforementioned air intake apparatus for an internal combustion engine according to this aspect, a corner of an entrance of each of the external gas introduction nozzles into which the external gas is introduced is preferably rounded.

According to this structure, as compared with the case where the corner of the entrance has a square shape, the pressure loss decreases when the external gas is introduced into the external gas introduction nozzles, and hence the external gas can be smoothly introduced into the air intake pipes.

In the aforementioned air intake apparatus for an internal combustion engine according to this aspect, the external gas introduction nozzles preferably protrude into the air intake pipes.

According to this structure, unlike the case where the external gas introduction nozzles do not protrude into the air intake pipes and are disposed outside the air intake pipes, it is possible to significantly reduce or prevent an increase in the size of the air intake apparatus.

In the aforementioned air intake apparatus for an internal combustion engine according to this aspect, the external gas introduction nozzles are preferably disposed on the head port side of the internal combustion engine relative to central portions of air intake pathways of the air intake pipes.

When distances between the external gas introduction nozzles and the cylinders of the engine are relatively large, a difference between the on/off timing of valves that control introduction of the external gas into the air intake pipes and stop thereof and the actual timing at which the external gas is introduced into the cylinders of the engine becomes large (the responsiveness becomes poor). Therefore, in order to stop introduction of the external gas into the cylinders of the engine at the desired timing, it is necessary to advance the timing at which the valves are turned off. In this case, the amount of the introduced external gas is reduced, and hence the effect of introduction of the external gas is reduced (the fuel economy is reduced). Thus, according to the present invention, as described above, the external gas introduction nozzles are disposed on the head port side of the engine relative to the central portions of the air intake pathways of the air intake pipes such that the distances between the external gas introduction nozzles and the cylinders of the engine become relatively small, and hence the responsiveness of introduction of the external gas into the engine can be improved. Consequently, the fuel economy of the internal combustion engine can be improved.

In the aforementioned air intake apparatus for an internal combustion engine in which the corner of the entrance of each of the external gas introduction nozzles into which the external gas is introduced is rounded, the external gas passage further includes an external gas inlet and an external gas distributor, and the corner of the entrance in a vicinity of a boundary between the external gas distributor and each of the external gas introduction nozzles is rounded.

According to this structure, the external gas can be smoothly introduced from the external gas distributor into the external gas passage.

In the aforementioned air intake apparatus for an internal combustion engine according to this aspect, the external gas is exhaust recirculation gas.

According to this structure, it is possible to improve the fuel economy while reducing the pumping loss (intake and exhaust loss) and further to improve emissions.

The aforementioned air intake apparatus for an internal combustion engine according to this aspect further includes an air intake apparatus main body provided with the air intake pipes, the air intake apparatus main body is formed by bonding a plurality of separate pieces to each other, the plurality of air intake pipes are curved, the air intake apparatus main body includes a first piece that constitutes inner peripheral sides of the curved air intake pipes, a second piece that constitutes outer peripheral sides of the curved air intake pipes and an inner peripheral side of the external gas passage, and a third piece that constitutes an outer peripheral side of the external gas passage, the external gas passage further includes an external gas inlet and an external gas distributor, the external gas distributor is formed in a hierarchically branched tournament shape, and the external gas introduction nozzles are integrally provided in a portion of the second piece corresponding to a lowermost hierarchy of the external gas distributor formed in a tournament shape.

According to this structure, it is not necessary to separately add a member (piece) in order to provide the external gas introduction nozzles, and hence it is possible to significantly reduce or prevent an increase in the number of components.

In the aforementioned air intake apparatus for an internal combustion engine according to this aspect, a protruding length of each of the external gas introduction nozzles from an entrance thereof, into which the external gas is introduced, into each of the air intake pipes is larger than the equivalent diameter of the exit of each of the external gas introduction nozzles.

According to this structure, the pressure loss can be sufficiently increased when the air flows back from the air intake pipes to the external gas introduction nozzles, and hence it is possible to effectively significantly reduce or prevent backflow of the air from the air intake pipes to the external gas introduction nozzles.

MODES FOR CARRYING OUT THE INVENTION

Embodiments of the present invention are hereinafter described on the basis of the drawings.

First Embodiment

The structure of an air intake apparatus 100 for an engine 110 according to a first embodiment of the present invention is now described with reference to FIGS. 1 to 5. The engine 110 is an example of an "internal combustion engine" in the claims.

Figure 1:
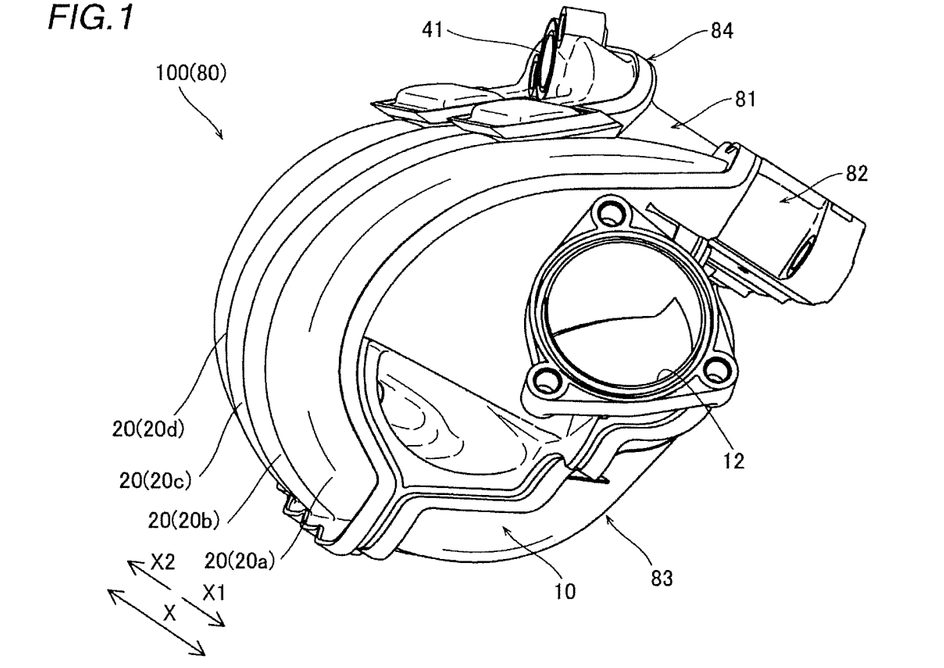
FIG. 1 A perspective view of an air intake apparatus according to a first embodiment of the present invention.
Figure 2:
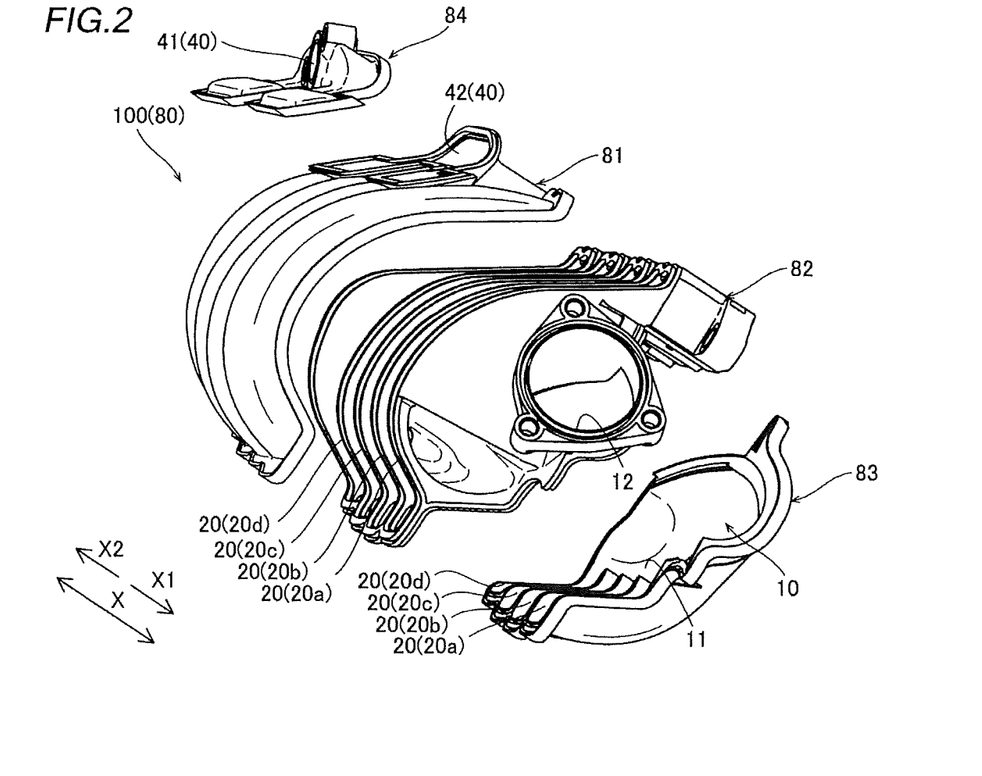
FIG. 2 An exploded perspective view of the air intake apparatus according to the first embodiment of the present invention.
Figure 4:
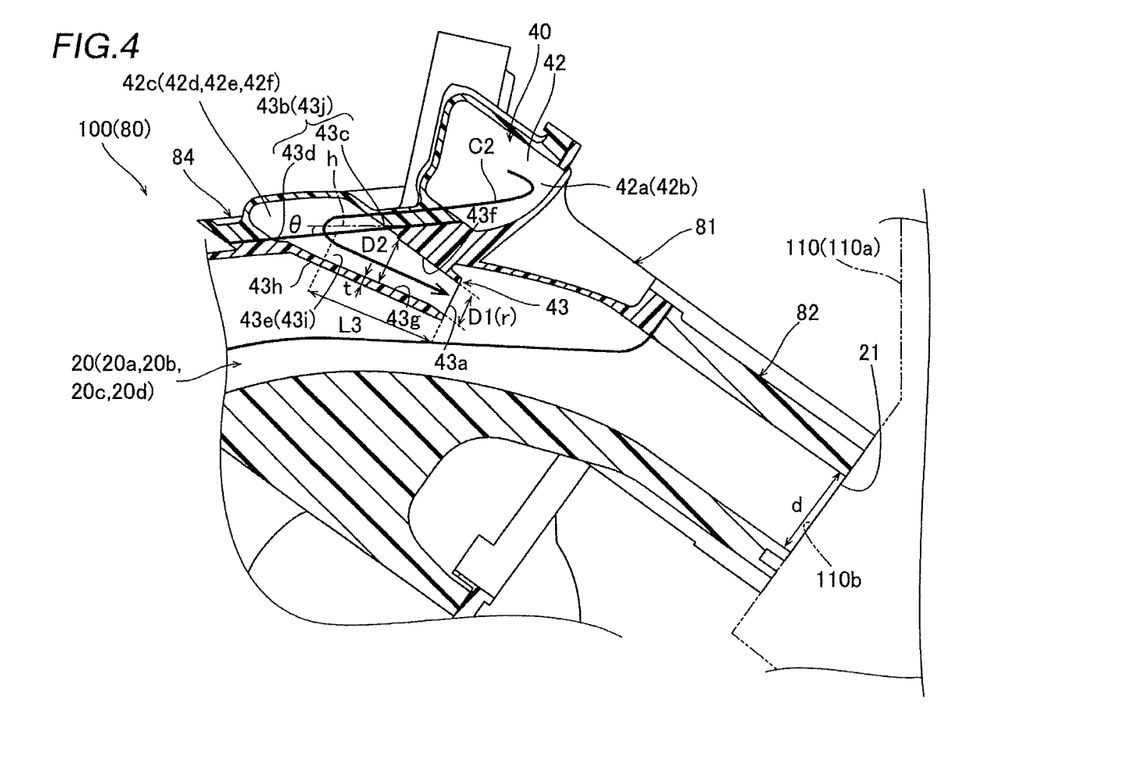
FIG. 4 A sectional view of the air intake apparatus according to the first embodiment of the present invention.

The air intake apparatus 100 according to the first embodiment of the present invention is mounted on the in-line four-cylinder engine 110 (see FIG. 4). As shown in FIGS. 1 and 2, the air intake apparatus 100 partially constitutes an air intake system that supplies air to the engine 110, and the air intake apparatus 100 includes an air intake apparatus main body 80 including a surge tank 10 and air intake pipes 20 disposed downstream of the surge tank 10.

In the air intake apparatus 100, intake air that reaches an air intake 12 via an air cleaner (not shown) and a throttle valve (not shown) serving as an air intake path flows into the surge tank 10.

EGR (Exhaust Gas Recirculation) gas, which is a portion of exhaust gas discharged from combustion chambers (cylinders (not shown)) to the outside, is recirculated to the engine 110 through the air intake apparatus 100. The EGR gas separated from the exhaust gas is cooled to a predetermined temperature (about 100° C.) and then introduced into the air intake apparatus main body 80. The EGR gas contains moisture. The EGR gas is an example of an "external gas" in the claims.

The air intake apparatus main body 80 (such as the surge tank 10, the air intake pipes 20, and EGR gas introduction nozzles 43 described later) is formed by resin molding (resin molding with a polyamide resin, for example). As shown in FIG. 2, the air intake apparatus main body 80 is formed by bonding a plurality of separate pieces to each other. A plurality of air intake pipes 20 are curved. The air intake apparatus main body 80 includes an upper piece 81 that constitutes the outer peripheral sides of the curved air intake pipes 20 and the inner peripheral side of an EGR gas passage 40 described later. The air intake apparatus main body 80 includes a middle piece 82 that constitutes the inner peripheral sides of the curved air intake pipes 20 and the upper half of the surge tank 10. The air intake apparatus main body 80 further includes a lower piece 83 that constitutes the lower half of the surge tank 10. The air intake apparatus main body 80 includes an EGR gas piece 84 that constitutes the outer peripheral side of the EGR gas passage 40. The air intake apparatus main body 80 is formed by bonding the upper piece 81, the middle piece 82, the lower piece 83, and the EGR gas piece 84 to each other by vibration welding and integrating them. The EGR gas passage 40 is an example of an "external gas passage" in the claims. The middle piece 82, the upper piece 81, and the EGR gas piece 84 are examples of a "first piece", a "second piece", and a "third piece" in the claims, respectively.

As shown in FIG. 2, the surge tank 10 includes a hollow body 11 that extends along a cylinder row of the engine 110 (see FIG. 4). In addition, the plurality of (four) air intake pipes 20 (air intake pipes 20a, 20b, 20c, and 20d) connected to a plurality of (four) cylinders of the engine 110, respectively, are connected to the body 11.

Figure 3:
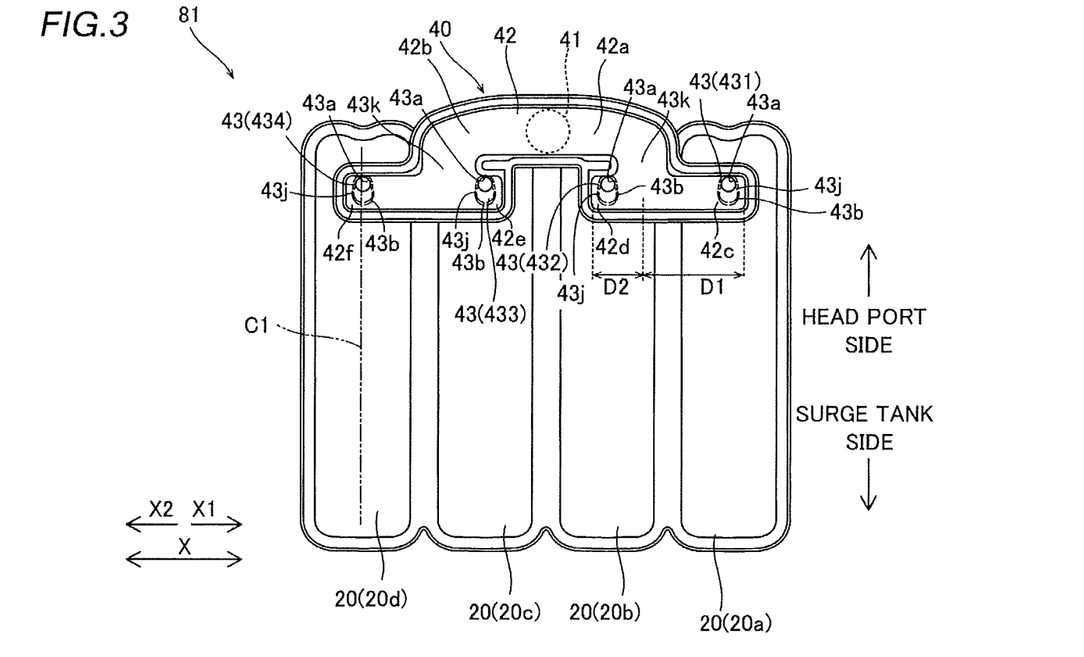
FIG. 3 A front view of an upper piece of the air intake apparatus according to the first embodiment of the present invention.

The EGR gas is introduced into the engine 110. Specifically, as shown in FIG. 3, the EGR gas passage 40 that distributes the EGR gas to the plurality of (four) air intake pipes 20 (air intake pipes 20a to 20d) is provided in the air intake apparatus main body 80. The inner peripheral side of the EGR gas passage 40 is constituted by the upper piece 81, and the outer peripheral side thereof is constituted by the EGR gas piece 84 (see FIG. 2).

The EGR gas passage 40 includes an EGR gas inlet 41 and an EGR gas distributor 42. The EGR gas distributor 42 is formed in a hierarchically branched tournament shape. Specifically, the EGR gas distributor 42 includes two flow paths, which are a flow path 42a (X1 side) and a flow path 42b (X2 side) of a first hierarchy, into which the EGR gas inlet 41 is branched. The EGR gas distributor 42 further includes two flow paths, which are a flow path 42c (X1 side) and a flow path 42d (X2 side) of a second hierarchy, into which the flow path 42a (X1 side) of the first hierarchy is branched. The EGR gas distributor 42 further includes two flow paths, which are a flow path 42e (X1 side) and a flow path 42f (X2 side) of a second hierarchy, into which the flow path 42b (X2 side) of the first hierarchy is branched. The length L1 of the flow path 42c (flow path 42e) of the second hierarchy in a direction X is larger than the length L2 of the flow path 42d (flow path 42f) of the second hierarchy in the direction X. The EGR gas inlet 41 and the EGR gas distributor 42 are examples of an "external gas inlet" and an "external gas distributor" in the claims, respectively.

According to the first embodiment, as shown in FIG. 4, the EGR gas passage 40 extends toward a head port 110b of a head 110a of the engine 110 connected to the air intake pipes 20, and includes the EGR gas introduction nozzles 43 that introduce the EGR gas into the air intake pipes 20. The length L3 of each of the EGR gas introduction nozzles 43 in a direction in which the EGR gas introduction nozzles 43 extend is larger than the equivalent diameter D1 of an exit 43a of the EGR gas introduction nozzles 43. For example, the length L3 is more than twice the equivalent diameter D1. Note that four EGR gas introduction nozzles 43 (EGR gas introduction nozzles 431, 432, 433, and 434, see FIGS. 3 and 5) are provided so as to correspond to the four air intake pipes 20 (air intake pipes 20a to 20d). The EGR gas introduction nozzles 431 to 434 have the same structure. The EGR gas introduction nozzles 43 are examples of an "external gas introduction nozzle" in the claims. The structure of one EGR gas introduction nozzle 43 is described below.

According to the first embodiment, as shown in FIG. 4, the EGR gas introduction nozzle 43 protrudes into a corresponding air intake pipe 20. Furthermore, the EGR gas introduction nozzle 43 protrudes toward the head port 110b of the engine 110. The protruding length D3 of the EGR gas introduction nozzle 43 from an entrance 43b, into which the EGR gas is introduced, into the air intake pipe 20 is larger than the equivalent diameter D1 of the exit 43a of the EGR gas introduction nozzle 43. Specifically, the length L3 of the EGR gas introduction nozzle 43 from the entrance 43b, into which the EGR gas is introduced, to the exit 43a is larger than the equivalent diameter D1 of the exit 43a. Note that the length L3 from the entrance 43b to the exit 43a varies according to a portion 43c (the upper surface 43f side of the inner peripheral surface 43e) on the head port 110b side of the engine 110 and a portion 43d (the lower surface 43g side of the inner peripheral surface 43e) opposite to the head port 110b. The length L3 from the portion 43c (the upper surface 43f side of the inner peripheral surface 43e) on the head port 110b side of the engine 110 of the entrance 43b to the exit 43a is the shortest, and the length L3 from the portion 43d (the lower surface 43g side of the inner peripheral surface 43e) opposite to the head port 110b of the entrance 43b to the exit 43a is the longest. According to the first embodiment, the length L3 from any portion of the entrance 43b to the exit 43a is larger than the equivalent diameter D1 of the exit 43a.

Figure 5:
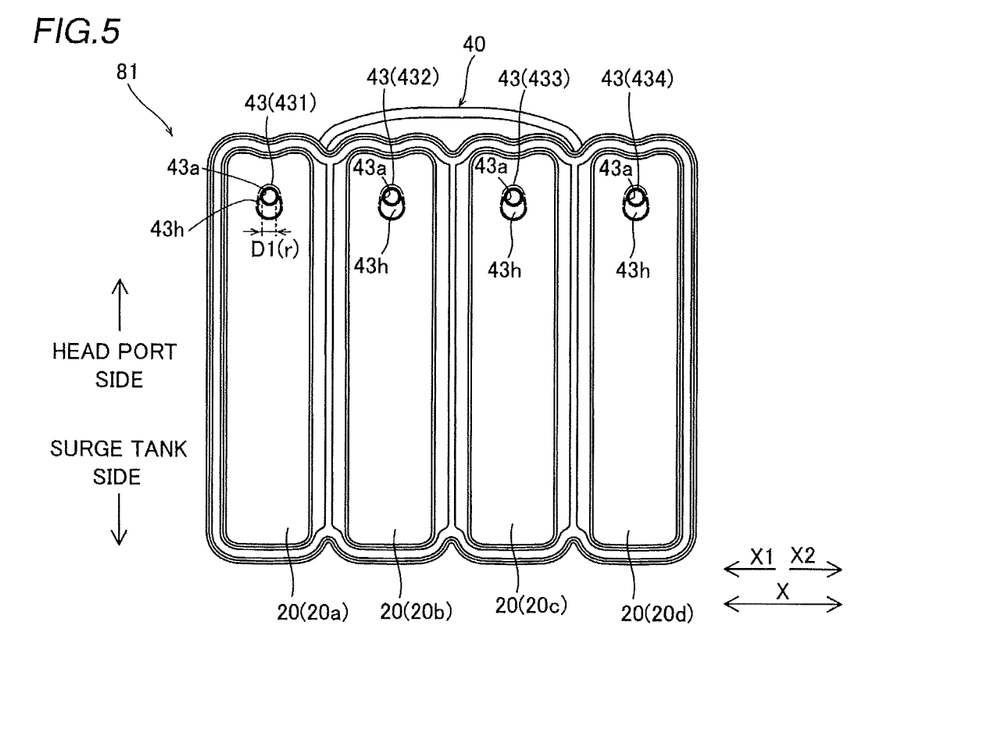
FIG. 5 A rear view of the upper piece of the air intake apparatus according to the first embodiment of the present invention.

As shown in FIG. 5, the exit 43a of the EGR gas introduction nozzle 43 has a substantially perfect circular shape. That is, the equivalent diameter D1 of the exit 43a of the EGR gas introduction nozzle 43 is substantially equal to the diameter r of the substantially perfect circular exit 43a.

As shown in FIG. 4, the length L3 of the EGR gas introduction nozzle 43 from the entrance 43b, into which the EGR gas is introduced, to the exit 43a is smaller than the equivalent diameter d of an exit 21 of the air intake pipe 20 on the head port 110b side and is larger than ½ of the equivalent diameter d. The exit 21 of the air intake pipe 20 on the head port 110b side is not a perfect circle. In this case, the equivalent diameter d of the exit 21 is a value (d=4×A/L) obtained by dividing, by the length L of a wall surface in a flow path cross-section, a value obtained by multiplying A by four times when A represents the flow path cross-sectional area of the air intake pipe 20.

According to the first embodiment, as shown in FIG. 4, the inner peripheral surface 43e of the EGR gas introduction nozzle 43 is formed in a tapered shape tapered toward the head port 110b. Specifically, the upper surface 43f side of the inner peripheral surface 43e of the EGR gas introduction nozzle 43 extends substantially linearly in a direction toward the head port 110b. The lower surface 43g side of the inner peripheral surface 43e of the EGR gas introduction nozzle 43 extends substantially linearly so as to be inclined with respect to the upper surface 43f. Thus, the equivalent diameter D1 (diameter r) of the exit 43a of the EGR gas introduction nozzle 43 is smaller than the equivalent diameter D2 on the entrance 43b side. The inner peripheral surface 43e of the EGR gas introduction nozzle 43 is formed in a tapered shape tapered toward the head port 110b, and hence the EGR gas introduced from the EGR gas introduction nozzle 43 is introduced in a direction in which air (intake air) that flows through the air intake pipe 20 flows.

The outer peripheral surface 43h of the EGR gas introduction nozzle 43 is formed so as to be tapered toward the head port 110b. That is, the thickness t (the thickness t on the lower surface 43g side and the side surface 43i side other than the upper surface 43f side) of the EGR gas introduction nozzle 43 in its diameter direction is substantially constant from the entrance 43b side of the EGR gas introduction nozzle 43 to the exit 43a side thereof. The thickness t of the EGR gas introduction nozzle 43 is slightly reduced in the vicinity of the exit 43a.

According to the first embodiment, a corner 43j of the entrance 43b of the EGR gas introduction nozzle 43 into which the EGR gas is introduced is rounded. Specifically, as shown in FIG. 3, the corner 43j of the entrance 43b in the vicinity of a boundary between the EGR gas distributor 42 and the EGR gas introduction nozzle 43 in the EGR gas passage 40 is rounded. That is, the entrance 43b of the EGR gas introduction nozzle 43 is tubular and has a funnel R shape that warps outward.

According to the first embodiment, as shown in FIG. 3, the EGR gas introduction nozzle 43 is disposed on the head port 110b side (see FIG. 4) of the engine 110 relative to a central portion of an air intake pathway C1 of the air intake pipe 20. Specifically, the intake air flows into the surge tank 10 from the air intake 12. Then, the intake air is distributed from the surge tank 10 to each of the air intake pipes 20 (air intake pipes 20a to 20d). Thereafter, the intake air flows into the engine 110 from the air intake pipes 20. The EGR gas introduction nozzle 43 is disposed in the vicinity of the head port 110b of the engine 110 in the air intake pathway C1 of the air intake pipe 20 (intake air).

As shown in FIG. 3, the EGR gas introduction nozzle 43 is integrally provided in a portion of the upper piece 81 corresponding to the lowermost hierarchy (second hierarchy) of the EGR gas distributor 42 formed in a tournament shape. Specifically, the EGR gas introduction nozzle 431 of the four EGR gas introduction nozzles 431 to 434 is provided in the vicinity of an X1 side end of the flow path 42c of the EGR gas distributor 42 constituted by the upper piece 81. The EGR gas introduction nozzle 432 is provided in the vicinity of an X2 side end of the flow path 42d. The EGR gas introduction nozzle 433 is provided in the vicinity of an X1 side end of the flow path 42e. The EGR gas introduction nozzle 434 is provided in the vicinity of an X2 side end of the flow path 42f.

As shown in FIG. 4, a portion 43k (see FIG. 3) (EGR gas pathway C2) that connects the flow path 42a (flow path 42b) of the EGR gas distributor 42 to the flow path 42c and the flow path 42d (the flow path 42e and the flow path 42f) of the EGR gas distributor 42 is inclined downward by a predetermined angle θ (5 degrees, for example) with respect to a horizontal line h (one-dot chain line). Thus, the moisture contained in the EGR gas flows to the cylinders of the engine 110, and hence it is possible to significantly reduce or prevent flow of the moisture contained in the EGR gas into the surge tank 10.

Effects of First Embodiment

According to the first embodiment, the following effects can be obtained.

According to the first embodiment, as hereinabove described, the length L3 of the EGR gas introduction nozzle 43 in the direction in which the EGR gas introduction nozzle 43 extends is larger than the equivalent diameter D1 of the exit 43a of the EGR gas introduction nozzle 43. Thus, the length L3 of the EGR gas introduction nozzle 43 is relatively large, and hence the pressure loss increases when air flows back from the air intake pipe 20 to the EGR gas introduction nozzle 43. Consequently, it becomes difficult for the air to flow back from the air intake pipe 20 to the EGR gas introduction nozzle 43, and hence it is possible to significantly reduce or prevent a decrease in the performance of the engine 110 due to backflow of the air to the EGR gas passage 40. Furthermore, it becomes difficult for the air to flow back from the air intake pipe 20 to the EGR gas introduction nozzle 43, and hence it is possible to significantly reduce or prevent variations in the amount of the EGR gas distributed to the plurality of cylinders (to improve the distributivity).

According to the first embodiment, as hereinabove described, the inner peripheral surface 43e of the EGR gas introduction nozzle 43 is formed in a tapered shape tapered toward the head port 110b. Thus, as compared with the case where the inner diameter of the EGR gas introduction nozzle 43 is constant, the pressure loss further increases when the air flows back from the air intake pipe 20 to the EGR gas introduction nozzle 43, and hence it is possible to further significantly reduce or prevent a decrease in the performance of the engine 110 due to backflow of the air to the EGR gas passage 40. Furthermore, the inner peripheral surface 43e of the EGR gas introduction nozzle 43 is formed in a tapered shape tapered toward the head port 110b such that the EGR gas is introduced toward the head port 110b, and hence disruption of flow of the intake air that flows through the air intake pipe 20 is significantly reduced or prevented. Consequently, it is possible to significantly reduce or prevent a decrease in the flow velocity of the intake air. Moreover, the inner peripheral surface 43e of the EGR gas introduction nozzle 43 is formed in a tapered shape tapered toward the head port 110b such that when the EGR gas introduction nozzle 43 is formed by resin molding, the EGR gas introduction nozzle 43 can be easily resin-molded by moving a metal mold to the side opposite to the head port 110b (in a direction opposite to a tapered direction). Thus, the EGR gas introduction nozzle 43 can be resin-molded integrally with the air intake apparatus main body 80 without separately adding a member (piece).

According to the first embodiment, as hereinabove described, the corner 43j of the entrance 43b of the EGR gas introduction nozzle 43 into which the EGR gas is introduced is rounded. Thus, as compared with the case where the corner 43j of the entrance 43b has a square shape, the pressure loss decreases when the EGR gas is introduced into the EGR gas introduction nozzle 43, and hence the EGR gas can be smoothly introduced into the air intake pipe 20.

According to the first embodiment, as hereinabove described, the EGR gas introduction nozzle 43 protrudes into the air intake pipe 20. Thus, unlike the case where the EGR gas introduction nozzle 43 does not protrude into the air intake pipe 20 and is disposed outside the air intake pipe 20, it is possible to significantly reduce or prevent an increase in the size of the air intake apparatus 100.

According to the first embodiment, as hereinabove described, the EGR gas introduction nozzle 43 is disposed on the head port 110b side of the engine 110 relative to the central portion of the air intake pathway C1 of the air intake pipe 20. When a distance between the EGR gas introduction nozzle 43 and a corresponding cylinder of the engine 110 is relatively large, a difference between the on/off timing of a valve that controls introduction of the EGR gas into the air intake pipe 20 and stop thereof and the actual timing at which the EGR gas is introduced into the cylinder of the engine 110 becomes large (the responsiveness becomes poor). Therefore, in order to stop introduction of the EGR gas into the cylinder of the engine 110 at the desired timing, it is necessary to advance the timing at which the valve is turned off. In this case, the amount of the introduced EGR gas is reduced, and hence the effect of introduction of the EGR gas is reduced (the fuel economy is reduced). Thus, according to the first embodiment, as described above, the EGR gas introduction nozzle 43 is disposed on the head port 110b side of the engine 110 relative to the central portion of the air intake pathway C1 of the air intake pipe 20 such that the distance between the EGR gas introduction nozzle 43 and the cylinder of the engine 110 becomes relatively small, and hence the responsiveness of introduction of the EGR gas into the engine 110 can be improved. Consequently, the fuel economy of the engine 110 can be improved.

According to the first embodiment, as hereinabove described, the corner 43j of the entrance 43b in the vicinity of the boundary between the EGR gas distributor 42 and the EGR gas introduction nozzle 43 is rounded. Thus, the EGR gas can be smoothly introduced from the EGR gas distributor 42 into the EGR gas introduction nozzle 43.

According to the first embodiment, as hereinabove described, the EGR gas is introduced into the air intake pipe 20. Thus, it is possible to improve the fuel economy while reducing the pumping loss (intake and exhaust loss) and further to improve emissions.

According to the first embodiment, as hereinabove described, the EGR gas introduction nozzle 43 is integrally provided in the portion of the upper piece 81 corresponding to the lowermost hierarchy of the EGR gas distributor 42 formed in a tournament shape. Thus, it is not necessary to separately add a member (piece) in order to provide the EGR gas introduction nozzle 43, and hence it is possible to significantly reduce or prevent an increase in the number of components.

According to the first embodiment, as hereinabove described, the protruding length D3 of the EGR gas introduction nozzle 43 from the entrance 43b, into which the EGR gas is introduced, into the air intake pipe 20 is larger than the equivalent diameter D1 of the exit 43a of the EGR gas introduction nozzle 43. Thus, the pressure loss can be sufficiently increased when the air flows back from the air intake pipe 20 to the EGR gas introduction nozzle 43, and hence it is possible to effectively significantly reduce or prevent backflow of the air from the air intake pipe 20 to the EGR gas introduction nozzle 43.

Second Embodiment

The structure of an air intake apparatus 200 for an engine 110 according to a second embodiment of the present invention is described with reference to FIG. 6. In the air intake apparatus 200 for the engine 110 according to the second embodiment of the present invention, the lower surface 243d of the inner peripheral surface 243c of an EGR gas introduction nozzle 243 is bent unlike the aforementioned first embodiment in which the lower surface 43g of the inner peripheral surface 43e of the EGR gas introduction nozzle 43 extends substantially linearly toward the head port 110b.

Figure 6:
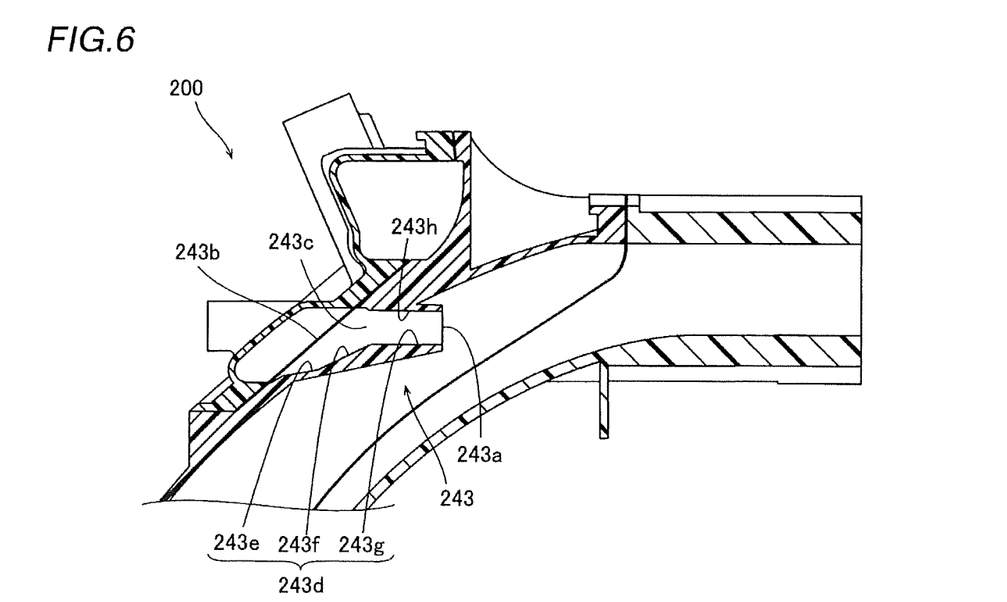
FIG. 6 A sectional view of an air intake apparatus according to a second embodiment of the present invention.

As shown in FIG. 6, in the EGR gas introduction nozzle 243 of the air intake apparatus 200 for the engine 110, the lower surface 243d of the inner peripheral surface 243c includes a first lower surface portion 243e provided on the entrance 243b side of the EGR gas introduction nozzle 243, a second lower surface portion 243f provided in the vicinity of a central portion of the EGR gas introduction nozzle 243, and a third lower surface portion 243g provided on the exit 243a side of the EGR gas introduction nozzle 243. The first lower surface portion 243e and the second lower surface portion 243f are inclined with respect to the upper surface 243h. On the other hand, the third lower surface portion 243g is provided substantially parallel to the upper surface 243h. That is, the lower surface 243d has a bent shape defined by the first lower surface portion 243e, the second lower surface portion 243f, and the third lower surface portion 243g. In the inner peripheral surface 243c of the EGR gas introduction nozzle 243, the inner diameter of a portion corresponding to the third lower surface portion 243g does not substantially change (has a cylindrical shape) toward a head port 110b. On the other hand, in the inner peripheral surface 243c of the EGR gas introduction nozzle 243, a portion corresponding to the second lower surface portion 243f is formed in a tapered shape tapered toward the head port 110b.

The remaining structures and effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications (modified examples) within the meaning and range equivalent to the scope of claims for patent are further included.

For example, while the example in which the present invention is applied to the air intake apparatus 100 (air intake apparatus 200) mounted on the in-line four-cylinder engine 110 has been shown in each of the aforementioned first and second embodiments, the present invention is not restricted to this. That is, the air intake apparatus according to the present invention may be mounted on an in-line multi-cylinder engine other than the in-line four-cylinder engine, or may be mounted on a V-type multi-cylinder engine, a horizontally opposed engine, or the like. As the engine, a gasoline engine, a diesel engine, a gas engine, or the like can be applied. Alternatively, the present invention is also applicable to air intake apparatuses mounted on not only an engine (internal combustion engine) mounted on a general vehicle (automobile) but also an internal combustion engine installed in transportation equipment such as a train or a ship or stationary equipment other than the transportation equipment.

While the example in which the exit 43a of the EGR gas introduction nozzle 43 (the exit 243a of the EGR gas introduction nozzle 243) has a substantially perfect circular shape has been shown in each of the aforementioned first and second embodiments, the present invention is not restricted to this. For example, the exit of the EGR gas introduction nozzle may have a shape (such as an elliptical shape) other than a substantially perfect circular shape.

While the example in which the inner peripheral surface 43e of the EGR gas introduction nozzle 43 (the inner peripheral surface 243c of the EGR gas introduction nozzle 243) is formed in a tapered shape tapered toward the head port 110b has been shown in each of the aforementioned first and second embodiments, the present invention is not restricted to this. For example, the inner peripheral surface of the EGR gas introduction nozzle may not be tapered toward the head port (the inner diameter may be constant toward the head port).

While the example in which the EGR gas introduction nozzle 43 (EGR gas introduction nozzle 243) protrudes into the air intake pipe 20 has been shown in each of the aforementioned first and second embodiments, the present invention is not restricted to this. For example, the EGR gas introduction nozzle may be disposed outside the air intake pipe such that the EGR gas introduction nozzle does not protrude into the air intake pipe.

While the example in which the EGR gas (exhaust recirculation gas) is introduced into the air intake pipe 20 has been shown in each of the aforementioned first and second embodiments, the present invention is not restricted to this. For example, as the "external gas" according to the present invention, blow-by gas (PCV gas) for ventilation in a crankcase may be introduced into the air intake pipe.

While the example in which the air intake apparatus main body 80 is made of resin (polyamide resin) has been shown in each of the aforementioned first and second embodiments, the present invention is not restricted to this. For example, the air intake apparatus main body may be made of metal.

While the example in which a valve that changes the length of the air intake pipe 20 (the length of the air intake pathway) is not provided in the air intake pipe 20 has been shown in each of the aforementioned first and second embodiments, the present invention is not restricted to this. For example, the present invention may be applied to an air intake pipe provided with a valve that changes the length of the air intake pipe (the length of an air intake pathway).

DESCRIPTION OF REFERENCE NUMERALS 20, 20a to 20d: air intake pipe
40: EGR gas passage (external gas passage)
41: EGR gas inlet (external gas inlet)
42: EGR gas distributor (external gas distributor)
43, 243: EGR gas introduction nozzle (external gas introduction nozzle)
43a, 243a: exit
43b, 243b: entrance
43e, 243c: inner peripheral surface
43j: corner
80: air intake apparatus main body
81: upper piece (second piece)
82: middle piece (first piece)
84: EGR gas piece (third piece)
100: air intake apparatus
110: engine (internal combustion engine)
110a: head
110b: head port
C1: air intake pathway
D1: equivalent diameter
L3: length (of the external gas introduction nozzle)

The invention claimed is:

1. An air intake apparatus of an internal combustion engine, comprising:
 a plurality of air intake pipes respectively connected to a plurality of cylinders of the internal combustion engine; and
 an external gas passage that distributes external gas to the plurality of air intake pipes, wherein
 the external gas passage extends toward a head port of a head of the internal combustion engine connected to the air intake pipes, and includes external gas introduction nozzles that introduce the external gas into the air intake pipes,
 a length of each of the external gas introduction nozzles in a direction in which the external gas introduction nozzles extend is larger than an equivalent diameter of an exit of each of the external gas introduction nozzles,
 the external gas passage includes an external gas inlet and an external gas distributor through which external gas flows to the external gas introduction nozzles, the external gas distributor defining first hierarchy flow paths branched from the external gas inlet and second hierarchy flow paths branched from each of the first hierarchy flow paths,
 the first hierarchy flow paths are arranged along air intake pathways of the air intake pipes,
 the first hierarchy flow paths are defined by a wall having an inner peripheral side on which the air intake pathways are provided, and are separated from the air intake pathways by the wall, and
 in a flat cross-section which passes through the first hierarchy flow paths, the air intake pathways, and the wall, the first hierarchy flow paths are provided directly at an outer peripheral side of the wall without an intervening space, and the air intake pathways are provided directly at the inner peripheral side of the wall without an intervening space.

2. The air intake apparatus of an internal combustion engine according to claim 1, wherein
 an inner peripheral surface of each of the external gas introduction nozzles is formed in a tapered shape tapered toward the head port.

3. The air intake apparatus of an internal combustion engine according to claim 1, wherein
 a corner of an entrance of each of the external gas introduction nozzles into which the external gas is introduced is rounded.

4. The air intake apparatus of an internal combustion engine according to claim 3, wherein
 the corner of the entrance in a vicinity of a boundary between the external gas distributor and each of the external gas introduction nozzles is rounded.

5. The air intake apparatus of an internal combustion engine according to claim 1, wherein
 the external gas introduction nozzles protrude into the air intake pipes.

6. The air intake apparatus of an internal combustion engine according to claim 1, wherein
 the external gas is exhaust recirculation gas.

7. The air intake apparatus of an internal combustion engine according to claim 1, further comprising an air intake apparatus main body provided with the air intake pipes, wherein
 the air intake apparatus main body is formed by bonding a plurality of separate pieces to each other,
 the plurality of air intake pipes are curved,
 the air intake apparatus main body includes a first piece that constitutes inner peripheral sides of the curved air intake pipes, a second piece that constitutes outer peripheral sides of the curved air intake pipes and an inner peripheral side of the external gas passage, and a third piece that constitutes an outer peripheral side of the external gas passage, the external gas distributor is formed in a hierarchically branched tournament shape, and the external gas introduction nozzles are integrally provided in a portion of the second piece corresponding to a lowermost hierarchy of the external gas distributor formed in the hierarchically branched tournament shape.

* * * * *